US012167483B2

(12) United States Patent
La Roche et al.

(10) Patent No.: US 12,167,483 B2
(45) Date of Patent: Dec. 10, 2024

(54) PROVIDING ENHANCED CAPACITY FOR TENANTS IN A NEUTRAL HOST NETWORK VIA MULTI-CONNECTIVITY

(71) Applicant: Cisco Technology, Inc., San Jose, CA (US)

(72) Inventors: Humberto Jose La Roche, Ocean, NJ (US); John T. Chapman, Orange, CA (US); Desmond Joseph O'Connor, London (GB)

(73) Assignee: Cisco Technology, Inc., San Jose, CA (US)

( * ) Notice: Subject to any disclaimer, the term of this patent is extended or adjusted under 35 U.S.C. 154(b) by 533 days.

(21) Appl. No.: 17/403,492

(22) Filed: Aug. 16, 2021

(65) Prior Publication Data
US 2023/0034500 A1    Feb. 2, 2023

Related U.S. Application Data

(63) Continuation of application No. 17/390,655, filed on Jul. 30, 2021, now abandoned.

(51) Int. Cl.
*H04W 76/15* (2018.01)
*H04W 28/02* (2009.01)
*H04W 72/0453* (2023.01)

(52) U.S. Cl.
CPC ....... *H04W 76/15* (2018.02); *H04W 28/0263* (2013.01); *H04W 72/0453* (2013.01)

(58) Field of Classification Search
CPC .... H04L 63/101; H04W 76/15; H04W 36/30; H04W 36/04; H04W 36/08; H04W 36/0058; H04W 76/10; H04W 48/20
(Continued)

(56) References Cited

U.S. PATENT DOCUMENTS 9,844,000 B2 * 12/2017 Chen ................ H04W 48/20
9,894,695 B2 *  2/2018 Chen ............. H04W 36/0058
(Continued)

FOREIGN PATENT DOCUMENTS

EP    2624638 B1 *  4/2018   ......... H04J 11/0059

OTHER PUBLICATIONS

O. O. Erunkulu, A. M. Zungeru, C. K. Lebekwe, M. Mosalaosi and J. M. Chuma, "5G Mobile Communication Applications: A Survey and Comparison of Use Cases," in IEEE Access, vol. 9, pp. 97251-97295, 2021, doi: 10.1109/ACCESS.2021.3093213. (Year: 2021).*

(Continued)

*Primary Examiner* — William D Cumming
(74) *Attorney, Agent, or Firm* — Polsinelli P.C.

(57) ABSTRACT

The present technology is directed to providing enhanced capacity for tenants in a neutral host network (NHN) via multi-connectivity such as dual connectivity or carrier aggregation. The present technology can identify, at a small cell gateway, signaling traffic passing from an access network to a respective core network of an NHN operating at mid-band frequencies and add an interface between the small cell gateway of the NHN and a base station of a tenant network operating at low-band frequencies to establish dual connectivity. Furthermore, the present technology can establish a radio resource control (RRC) connection in a primary cell residing in a macro network operating at low-band frequencies and add, at a fronthaul gateway, one or more secondary cells in a small cell network operating at mid-band frequencies to enable carrier aggregation of the one or more secondary cells with the primary cell the small cell network.

10 Claims, 11 Drawing Sheets

(58) Field of Classification Search
USPC .................................................. 370/331, 338
See application file for complete search history.

(56) References Cited

U.S. PATENT DOCUMENTS

| | | | |
|---|---|---|---|
| 10,271,252 B2 | 4/2019 | Jung et al. | |
| 11,140,611 B2* | 10/2021 | Raval | H04L 63/0853 |
| 11,272,410 B2* | 3/2022 | Sharma | H04W 36/04 |
| 2010/0160743 A1 | 6/2010 | Jeong et al. | |
| 2014/0301308 A1 | 9/2014 | Hahn et al. | |
| 2014/0348062 A1 | 11/2014 | Anwar | |
| 2015/0359019 A1* | 12/2015 | Chen | H04W 36/0058 |
| | | | 370/329 |
| 2016/0007255 A1* | 1/2016 | Sharma | H04W 36/08 |
| | | | 370/331 |
| 2016/0112945 A1* | 4/2016 | Chen | H04W 76/10 |
| | | | 370/338 |
| 2016/0212798 A1 | 7/2016 | Jha et al. | |
| 2017/0311217 A1* | 10/2017 | Jung | H04W 36/30 |
| 2018/0132147 A1* | 5/2018 | Sharma | H04W 36/04 |
| 2018/0343567 A1 | 11/2018 | Ashrafi | |
| 2020/0092795 A1* | 3/2020 | Raval | H04L 63/101 |
| 2021/0119962 A1 | 4/2021 | Ramia et al. | |
| 2021/0135733 A1* | 5/2021 | Huang | G06N 3/084 |
| 2022/0159533 A1* | 5/2022 | Sharma | H04W 36/04 |
| 2023/0034500 A1* | 2/2023 | La Roche | H04W 76/15 |

OTHER PUBLICATIONS

International Search Report and Written Opinion for PCT application No. PCT/US2022/038467, issued on Nov. 18, 2022, 12 pages.

\* cited by examiner

PROVIDING ENHANCED CAPACITY FOR TENANTS IN A NEUTRAL HOST NETWORK VIA MULTI-CONNECTIVITY

CROSS-REFERENCE TO RELATED APPLICATIONS

This application is a continuation of U.S. patent application Ser. No. 17/390,655, filed on Jul. 30, 2021, the content of which is incorporated herein by reference in its entirety.

TECHNICAL FIELD

The subject matter of this disclosure relates in general to the field of computer networking, and more particularly, in providing enhanced capacity for tenants in a neutral host network via multi-connectivity.

BACKGROUND

Current mobile and wireless communication systems have widely adopted a next-generation wireless communication system, 5G, or new radio (NR) that provides much higher data rates and lower latency. A major design objective for the 5G services is to provide a good balance between coverage (e.g., geographical reach) and capacity (e.g., bits per second), which entails proper spectrum management. While coverage spectrum is typically low-band (<2 GHz) paired spectrum, capacity spectrum is commonly deployed at mid-band frequencies (>2.5 GHz) and offers lower geographic reach. As the inter-site distances are much larger with coverage spectrum and acquisition and construction costs are lower for a given region, coverage spectrum can be a more economical choice than capacity spectrum.

BRIEF DESCRIPTION OF THE DRAWINGS

Illustrative embodiments of the present application are described in detail below with reference to the following figures.

DETAILED DESCRIPTION

Figure 1A:
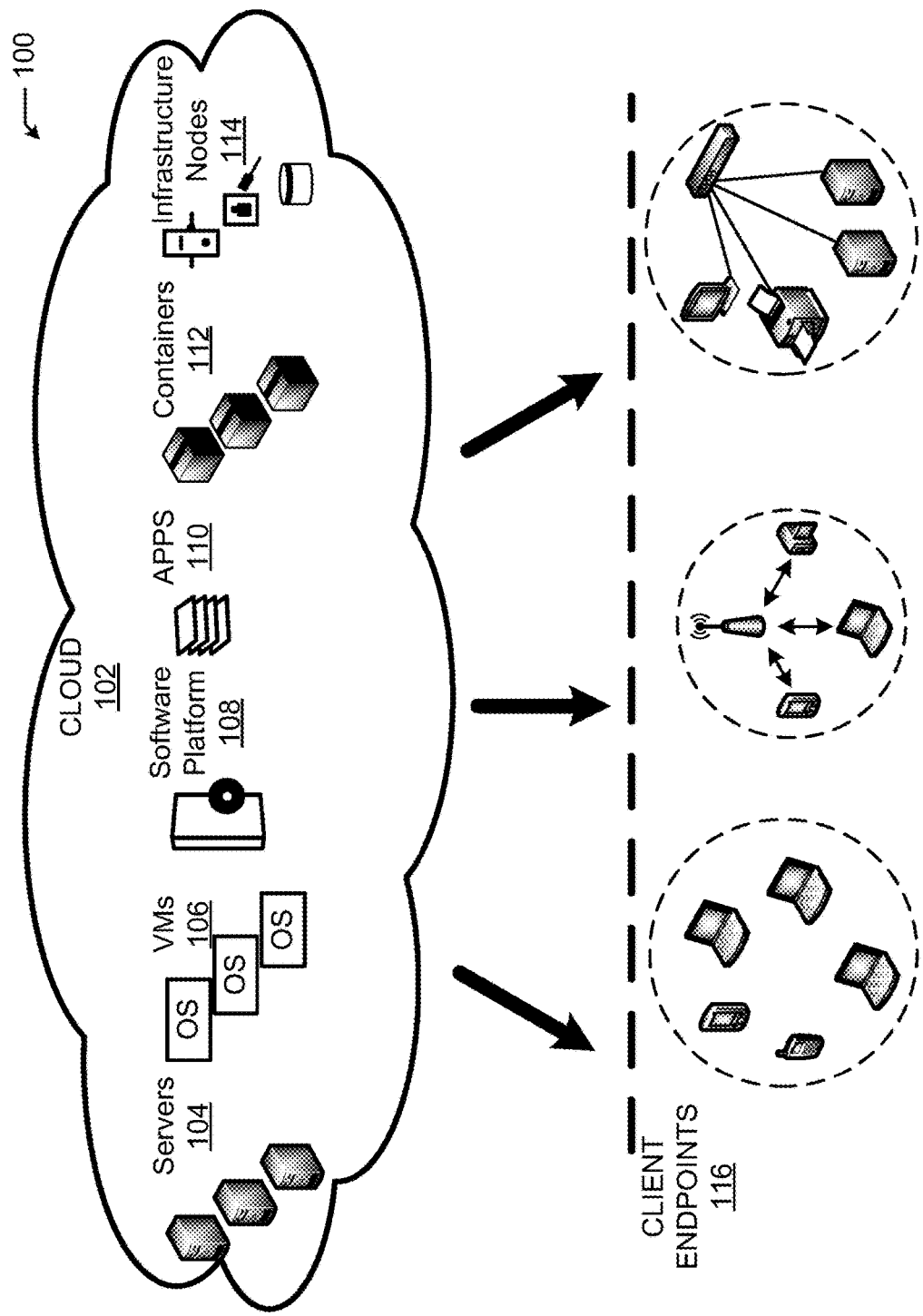
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As the demand for 5G continues to increase, network operators need to find a way to densify networks while minimizing additional costs. A neutral host network (NHN) allows multiple mobile network operators (MNOs) to share infrastructure for improved coverage, capacity, and economic efficiency. For example, an NHN operator (i.e., a landlord) can offer its customers (i.e., tenants) access to a shared radio access network (RAN). As multiple operators (e.g., tenants) can utilize the same infrastructure via the NHN, deployment and operating costs can be significantly reduced.

Also, every 5G service providers (e.g., MNOs) need to supply both coverage and capacity. A lower frequency spectrum is better for coverage while a higher frequency spectrum is better for capacity. A high-frequency spectrum is primarily used when data traffic is dense and substantial capacity is required. However, due to a lower cost, MNOs frequently opt for a lower frequency spectrum as fewer base stations are required to achieve greater geographic coverage.

Therefore, there is a need for providing enhanced capacity for network operators that have their own coverage network. More specifically, there exists a need for providing enhanced capacity for tenant operators in a neutral host network. An NHN operator may avail itself of the mid-band spectrum (i.e., capacity spectrum) and build a densified RAN infrastructure so that the NHN operator can provide capacity for small cell deployment to its tenants.

The present technology includes systems, methods, and computer-readable media for solving these problems and discrepancies. Specifically, systems, methods, and computer-readable media for providing enhanced capacity for tenants in a neutral host network via multi-connectivity such as dual connectivity or carrier aggregation. Further, the present technology includes systems, methods, and computer-readable media for facilitating the integration of the NHN operated at mid-band frequencies with a tenant coverage system via multi-connectivity.

OVERVIEW

Methods, systems, and non-transitory computer-readable media are provided for providing enhanced capacity for tenants in a neutral host network via multi-connectivity (e.g., dual connectivity or carrier aggregation).

Given that the 5G system integrates powerful spectrum management techniques such as multi-connectivity (e.g., dual connectivity or carrier aggregation), NHN operator can provide its tenants that have their network at low-band frequencies with access to an access network at mid-band frequencies by utilizing multi-connectivity.

Multi-connectivity is a set of 5G techniques equivalent to what is often known as "channel bonding." In general, multi-connectivity, which operates across multiple carriers, comprises two techniques, dual connectivity, and carrier aggregation. Dual connectivity operates at a Packet Data Convergence Protocol (PDCP) layer and combines two carriers at different frequencies (e.g., cells or channels) for higher throughput. The two carriers reside at two different base stations. On the other hand, carrier aggregation operates at a Medium Access Control (MAC) layer and combines one or more carriers at different frequencies (e.g., cells or channels) for higher throughput. The multiple carriers reside at a single logical base station.

According to at least one example of the present technology, a network operator can deploy NR or keep LTE in a low-band spectrum with massive multiple-input and multiple-output (MIMO) at C-band frequencies. The use of massive MIMO enables longer downlink coverage due to the ability to focus power into a narrow pencil beam. Then, multi-connectivity can be deployed between a mid-band network and a low-band network using the low band network as a primary carrier. Also, multi-connectivity can provide a stable canopy of high-speed downlink with a coverage extension. For example, in carrier aggregation, cross-carrier scheduling (e.g., scheduling downlink control indication (DCI) in low-band) can extend the reach of the mid-band carrier because the PDCCH carrying DCI is carried in low-band, which has a longer reach.

According to some examples of the present technology with respect to dual connectivity, the present technology can identify, at a small cell gateway, signaling traffic passing from an access network to a respective core network of a first network operating at mid-band frequencies (e.g., an NHN), establish a cross-connectivity between the access network and the respective core network based on the signaling traffic, and add an interface between the small cell gateway of the NHN and a base station of a tenant network operating at low-band frequencies (e.g., a tenant network) to establish dual connectivity between the NHN and the tenant network.

The present technology can further generate a translation table to monitor the signaling traffic and arrange the signaling traffic into different interfaces to abstract the NHN to a single node.

The cross-connectivity can be established through a network controller at the small cell gateway, the network controller controlling a data flow between the access network and the respective core network. The network controller can include a list of public land mobile network (PLMN) identifiers of one or more core networks connected to the network controller.

The dual connectivity between the NHN and the second network can provide the tenant network with access to a capacity layer of the NHN. The dual connectivity can be one of an Evolved-Terrestrial Radio Access Network New Radio-Dual Connectivity (ENDC) or a New Radio-Dual Connectivity (NRDC).

According to an example of the present technology with respect to carrier aggregation, the present technology can establish a radio resource control (RRC) connection in a primary cell residing in a macro network (e.g., a tenant network), the macro network operating at low-band frequencies, establish a protocol data unit session to allow user data flow through the primary cell in the macro network, and add, at a fronthaul gateway, secondary cell(s) in a small cell network (e.g., an NHN) to enable carrier aggregation of the secondary cell(s) with the primary cell based on the RRC connection, the small cell network operating at mid-band frequencies.

Furthermore, the present technology can partition bandwidth in the small cell network into bandwidth part(s), wherein each of the bandwidth part(s) is allocated to each of baseband(s) of the macro network.

The present technology can further identify the macro network based on a virtual local area network (VLAN) identifier associated with the primary cell, the VLAN identifier mapped to a bandwidth part associated with the macro network.

Also, the present technology can receive a measurement report on the small cell network, wherein the addition of the secondary cell(s) in the small cell network is based on the measurement report.

A network node of the small cell network adds the small cell(s) through MAC elements. The small cell(s) residing in the small cell network partition network traffic into physical resource blocks.

The small cell(s) are aggregated with a plurality of primary cells. The small cell network appears as a set of the secondary cell(s) subordinate to the primary cell residing in the macro network. The small cell network is a neutral host network and the macro network is a tenant network, wherein the tenant network has an access to a capacity layer of the neutral host network.

A system for providing enhanced capacity for tenants in a neutral host network via multi-connectivity (e.g., dual connectivity or carrier aggregation) can include one or more processors and at least one computer-readable storage medium storing instructions which, when executed by the one or more processors, cause the one or more processors to identify, at a small cell gateway, signaling traffic passing from an access network to a respective core network of a first network operating at mid-band frequencies, establish a cross-connectivity between the access network and the respective core network based on the signaling traffic, and add an interface between the small cell gateway of the first network and a base station of a second network operating at low-band frequencies to establish dual connectivity between the first network and the second network.

Another system for providing enhanced capacity for tenants in a neutral host network via multi-connectivity (e.g., dual connectivity or carrier aggregation) can include one or more processors and at least one computer-readable storage medium storing instructions which, when executed by the one or more processors, cause the one or more processors to establish an RRC connection in a primary cell residing in a macro network, the macro network operating at low-band frequencies, establish a protocol data unit session to allow user data flow through the primary cell in the macro network, and add, at a fronthaul gateway, one or more secondary cells in a small cell network to enable carrier aggregation of the one or more secondary cells with the primary cell based on the RRC connection, the small cell network operating at mid-band frequencies.

A non-transitory computer-readable storage medium having stored therein instructions which, when executed by one or more processors, can cause the one or more processors to identify, at a small cell gateway, signaling traffic passing from an access network to a respective core network of a first network operating at mid-band frequencies, establish a cross-connectivity between the access network and the respective core network based on the signaling traffic, and add an interface between the small cell gateway of the first network and a base station of a second network operating at low-band frequencies to establish dual connectivity between the first network and the second network.

Another non-transitory computer-readable storage medium having stored therein instructions which, when executed by one or more processors, can cause the one or more processors to establish an RRC connection in a primary cell residing in a macro network, the macro network operating at low-band frequencies, establish a protocol data unit session to allow user data flow through the primary cell in the macro network, and add, at a fronthaul gateway, one or more secondary cells in a small cell network to enable carrier aggregation of the one or more secondary cells with the primary cell based on the RRC connection, the small cell network operating at mid-band frequencies.

DESCRIPTION

The disclosed technology addresses the need in the art for providing enhanced capacity for tenants in a neutral host network via multi-connectivity such as dual connectivity or carrier aggregation.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
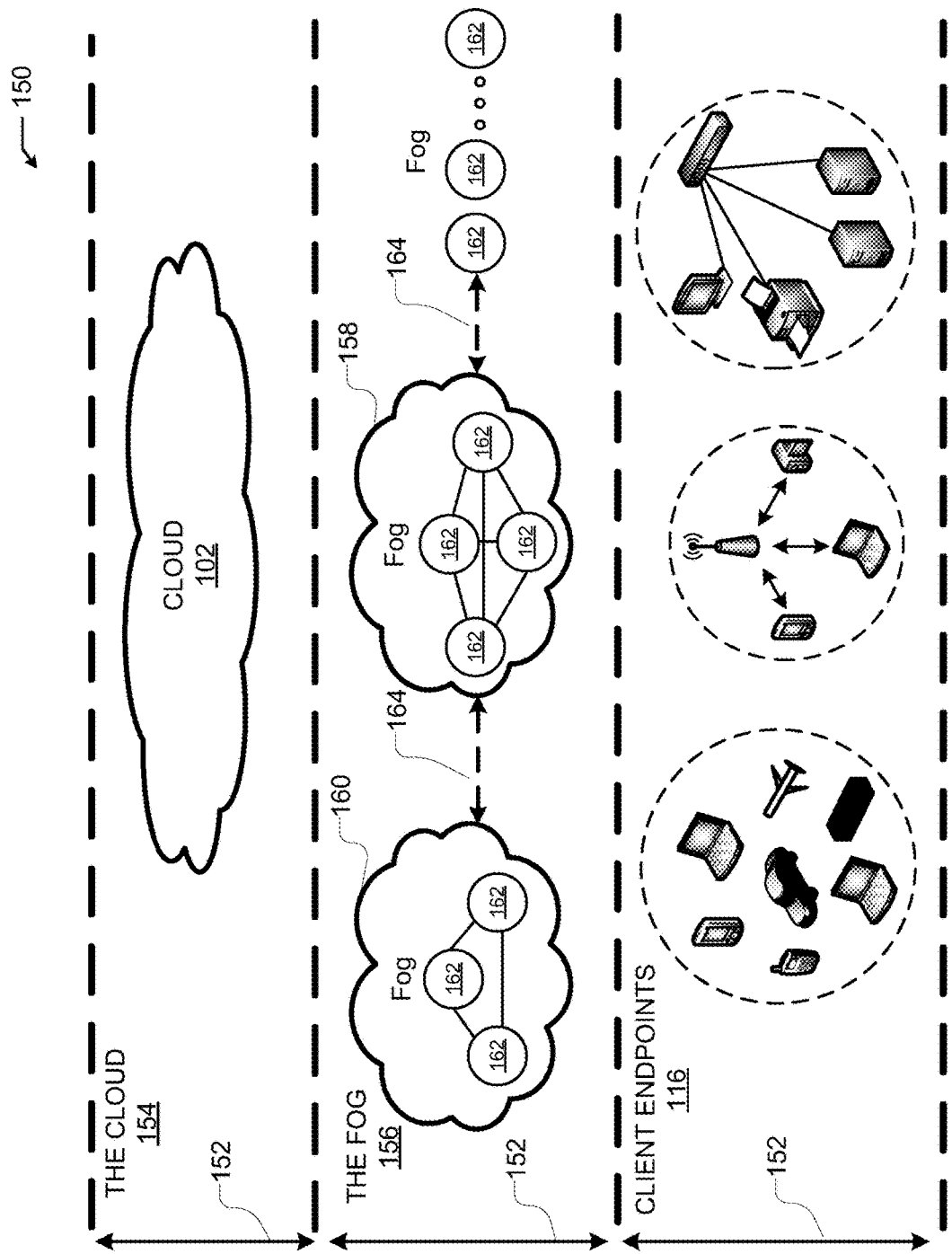
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
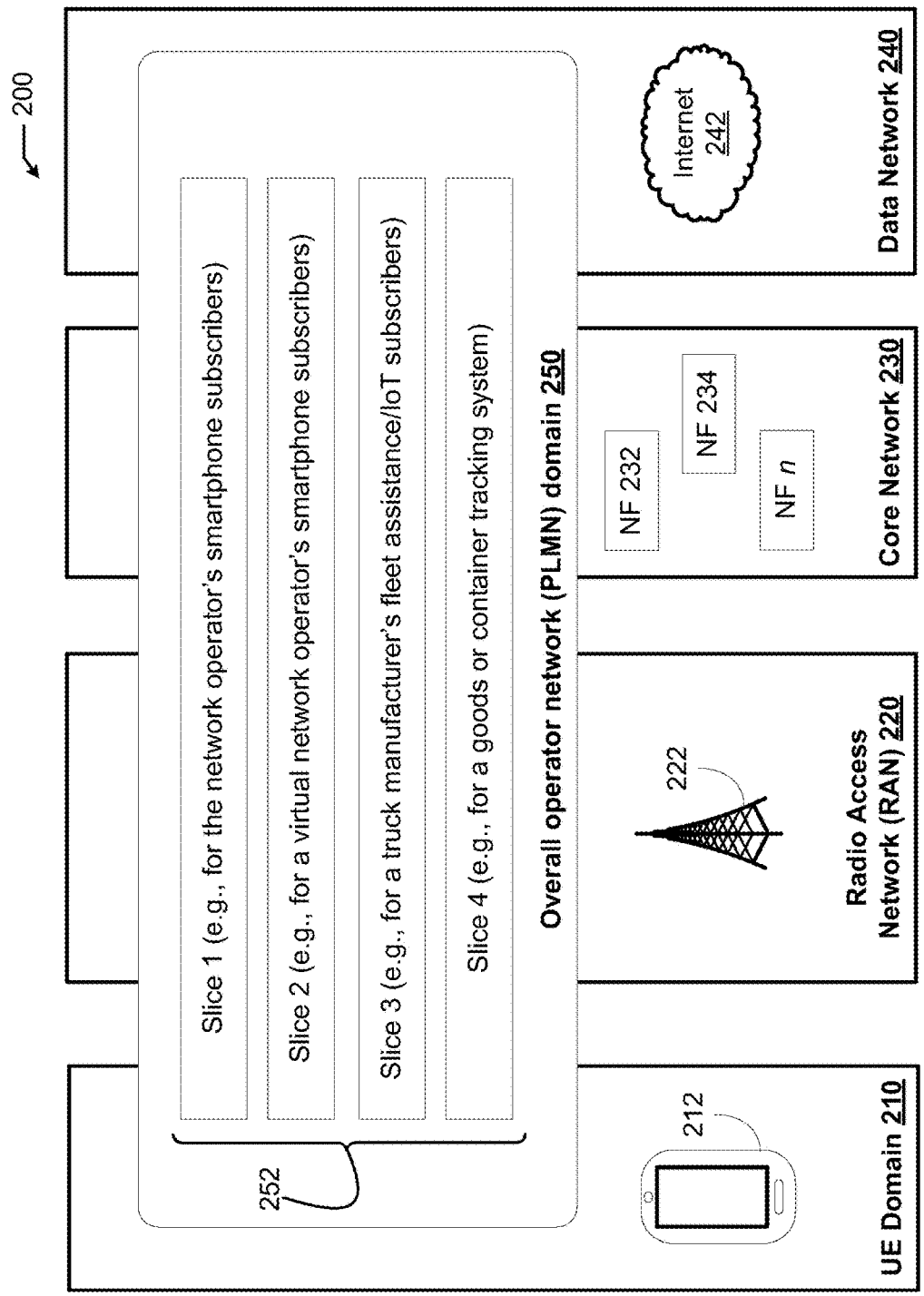
FIG. 2 depicts an exemplary schematic representation of a 5G network environment in which network slicing has been implemented, and in which one or more aspects of the present disclosure may operate.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Figure 3:
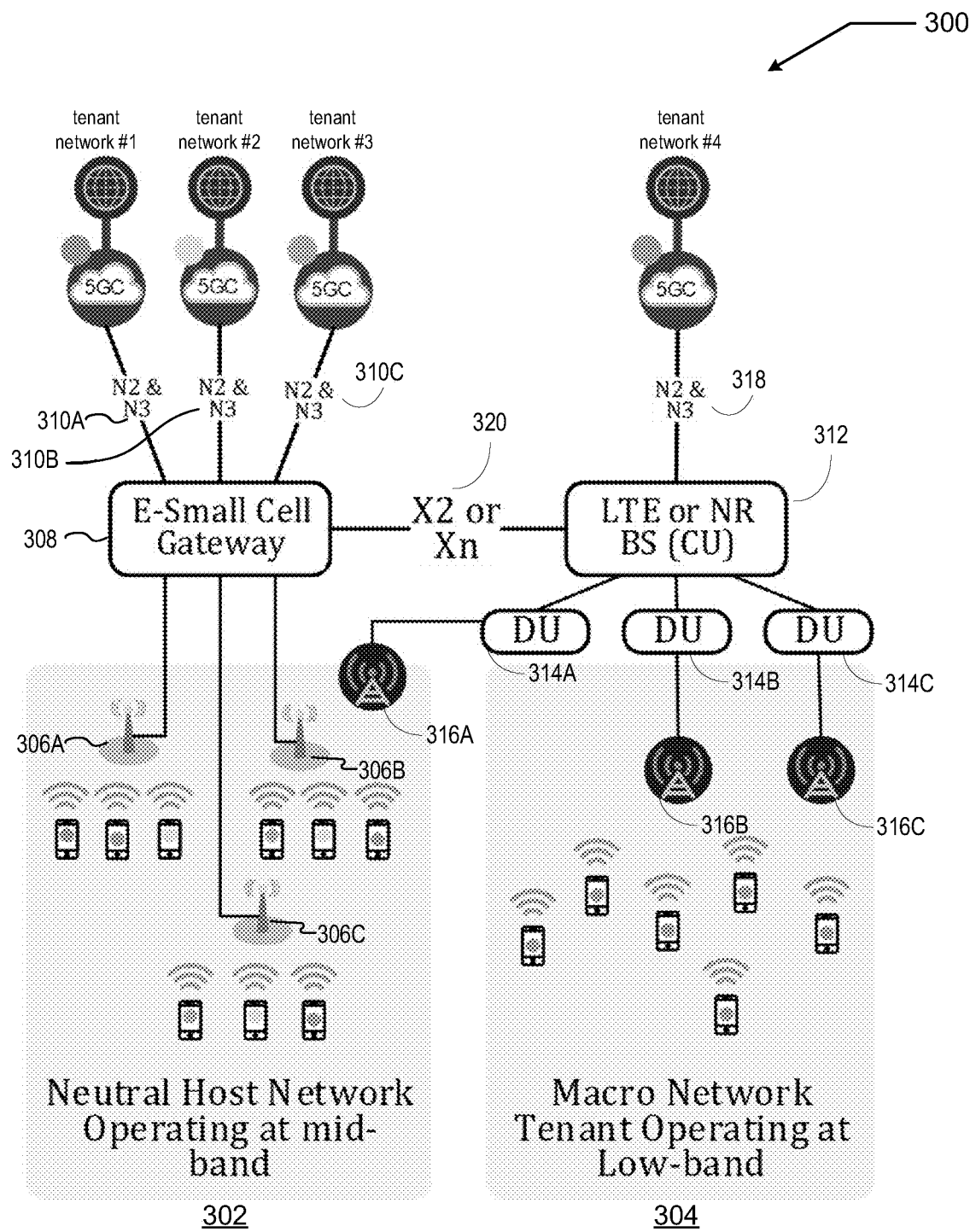
FIG. 3 illustrates an example diagram of a network architecture with dual connectivity established between a neutral host network and tenant networks in accordance with some examples of the present disclosure.

FIG. 3 illustrates an example diagram of a network architecture 300 with dual connectivity established between a neutral host network and a tenant network in accordance with some examples of the present disclosure. According to some examples, network architecture 300 comprises NHN 302 and tenant network 304 (for example, tenant networks #1, #2, #3, and #4 as illustrated in FIG. 3). In particular, NHN 302 operates at mid-band frequencies (>2.5 GHz) and tenant network 304 operates on Frequency Division Duplex (FDD) frequencies.

In some examples, NHN 302 is a small cell network deployed over a broadband access infrastructure. For example, NHN 302 deploys capacity-based 5G or LTE using small cells 306A-306C (collectively, 306). Small cells 306 deployed in NHN 302 support N2, N3, or Xn interfaces 310A, 310B, and 310C (collectively, 310) or equivalent LTE interfaces.

Some examples of NHN 302 can include a cable multiple-system operator (MSO) leveraging its cable plant for small cell densification or an mm-wave mesh-based broadband access provider that uses its network to plant small cells in the coverage system. Also, as another example of NHN 302, a venue (e.g., a stadium, an arena, or an amphitheater) can deploy indoor Citizens Broadband Radio Service (CBRS) and offer a tenant operating at low-band frequencies (e.g., macro coverage spectrum) to leverage the spectrum through multi-connectivity (e.g., dual connectivity or carrier aggregation).

In some examples, tenant network 304 comprises a base station, which can be in a split base station architecture. For example, base station 312 can be divided into two components named centralized unit (CU) 312 and distributed unit (DU) 314A-314C (collectively, 314), which are connected to cells 316A-316C (collectively, 316). While CU 312 provides support for higher layers of the protocol stack, DU 314 provides support for lower layers of the protocol stack. CU 312 can be individually served for a single base station (e.g., gNB). Multiple DUs 314 can be connected to CU 312. Also, each DU can support one or more cells 316. Furthermore, cells 316 deployed in tenant network 304 support N2, N3, or Xn interfaces 318 or equivalent LTE interfaces.

For the purposes of describing the present disclosure, Open-Radio Access Network (O-RAN) terminology is used for the function of the radio stack. For example, DU 314 encompasses the Radio Link Control (RLC)/MAC and High-physical (PHY) layers whereas CU 312 encompasses the RRC and PDCP/Service Data Adaptation Protocol (SDAP) layer functions.

In some instances, enhanced small cell gateway (E-SCG) 308 deployed in NHN 302 can abstract the densified small cell infrastructure of NHN 302 to a single logical RAN node (e.g., gNB) so that tenant network 304 can have access to resources in NHN 302. For example, E-SCG 308 can monitor N2 and N3 traffic 310 flowing through E-SCG 308 and build a translation table. The translation table can be used to segregate traffic by type (e.g., N2, N3, or Xn interfaces) into different interfaces and translate parameters to make the entire small cell collection of NHN 302 appear to be a single gNB. The parameters that can be translated can include, but not limited to, information elements in the X2 or Xn protocol such as GPRS Tunneling Protocol (GTP) tunnel endpoint identifier (TEID) and PLMN identity (PLMN-id). In other words, E-SCG 308 can monitor X2 and Xn traffic 310 to create a translation table and separate traffic into different interfaces. This way NHN 302 can be abstracted to a single RAN to which tenant network 304 has access.

In some examples, X2 or Xn interface 320 can be deployed between E-SCG 308 of NHN 302 and CU 312 of tenant network 304 to support dual connectivity.

As illustrated in FIG. 3, instead of deriving Xn interface 320 from each individual base station or small cell 306, network architecture 300 with dual connectivity uses E-SCG 308 to create an aggregation point, i.e., to provide a single interface. For example, traditionally, each small cell 306 has to have an interface into CU 312 in tenant network 304. However, in some examples in accordance with the present disclosure, E-SCG 308 can aggregate all small cells 306 as a single node without deploying an interface for each one of small cells 306 so that a densified complex small cell network (e.g., NHN 302) that may consist of thousands of units can be abstracted into a single node. As such, a single set of IP addresses between E-SCG 308 in NHN 302 and CU 312 in tenant network 304 can be utilized.

Figure 4:
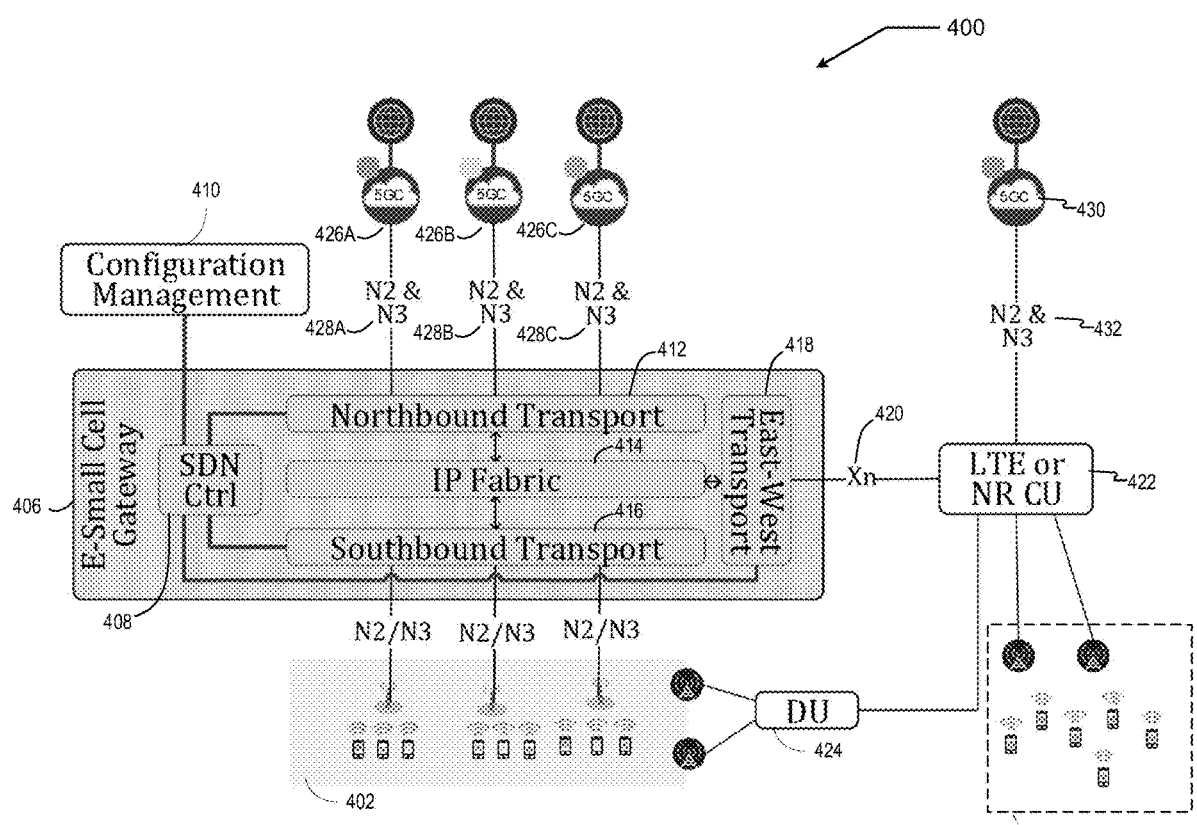
FIG. 4 illustrates an example diagram of network architecture showing an enhanced small cell gateway in a neutral host network in accordance with some examples of the present disclosure.

FIG. 4 illustrates an example diagram of a network architecture 400 showing an enhanced small cell gateway in a neutral host network in accordance with some examples of the present disclosure. In some examples, network architecture 400 comprises NHN 402 operating at mid-band frequencies and network tenant 404 operating at low-band frequencies. E-SCG 406 deployed in NHN 302 can comprise network controller 408 (e.g., software-defined networking (SDN) controller) including configuration management 410, northbound transport 412, IP fabric 414, southbound transport 416, and east-west transport 418. Also, tenant network 404 can comprise a base station, which can be split into CU 422 and DU 424 and connected to core network 430 via N2 or N3 interface 432.

In some instances, network controller 408 knows the PLMN-IDs of core networks 426A-426C (collectively, 426) that are connected to network controller 408 via N2 or N3 interface 428A-428C (collectively, 428). E-SCG 406 can inspect signaling traffic to identify where initial attach messages are coming from based on the PLMN-IDs.

In some examples, as signaling connections are created, E-SCG 406 can create a cross-connect at the IP level seeded with the initial PLMN-ID vs port number mapping and implemented through network controller 408 instructing packets how to flow between the RAN networks and the respective core networks 424. For example, E-SCG 406 can cross-connect (switches) traffic based on the PLMN-id of each tenant that UE belongs to.

Furthermore, Xn interface 420 can be added between E-SCG 406, more specifically, east-west transport 418 and CU 424 to support dual connectivity. Example types of dual connectivity can include but are not limited to, E-UTRA-NR dual connectivity (EN-DC) and NR-NR dual connectivity (NR-DC).

Figures 5A, 5B:
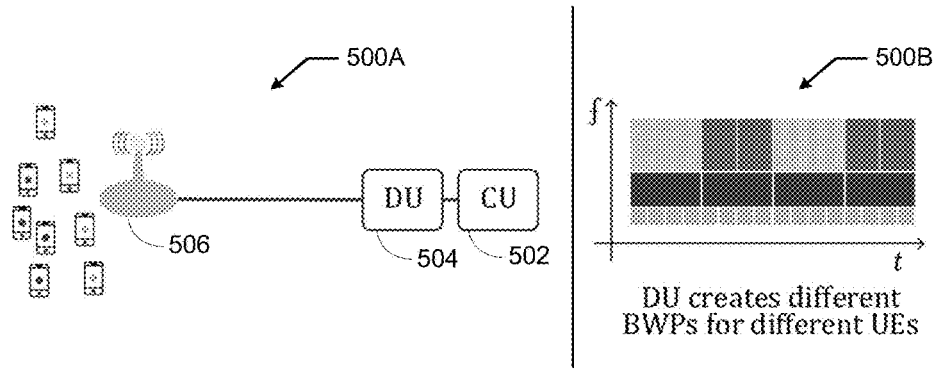
FIGS. 5A and 5B illustrate an example diagram of and an example graph of frequency domain representation of bandwidth parts in accordance with some examples of the present disclosure.

FIGS. 5A and 5B illustrate an example network architecture 500A with a combination of CU and DU and an example graph 500B of frequency domain representation of bandwidth parts (BWPs) in accordance with some examples of the present disclosure. In network architecture 500A, a combination of CU 502 and DU 504 is connected to small cell 506.

In some examples, the spectrum of an NHN can be allocated to different tenants (i.e., 5G RAN slicing) based on the concept of the BWP. A BWP occupies a contiguous set of Physical Resource Blocks (PRBs). For example, each tenant is allocated with the NHN spectrum based on a bandwidth part (BWP) and identified with a VLAN tag (e.g., identifier).

Every cell has initial UL/DL BWPs. Typically, BWPs are configured through RRC signaling, but there is no RRC signaling before the initial access (IA) procedure. As such, the initial UL/DL BWPs need to be bootstrapped through the IA procedures from UEs that are RRC_INACTIVE or RRC_IDLE. During the IA procedure, the UEs can perform cell search based on detecting the Synchronization Signal Block (SSB) comprised of Primary Synchronization (PSS), Secondary Synchronization Signal (SSS), and Physical Broadcast Channel (PBCH). The UE can further read System Information Block 1 (SIB1) from Physical Downlink Shared Channel (PDSCH), which carries the initial UL/DL BWP configuration. The SIB1 is transmitted on the PDSCH using the CORESET with index zero (e.g., CORESET #0). The base station may subsequently after the UE has entered RRC CONNECTED state, reconfigure the mobile via RRC signaling with four UL/DL BWPs, only one of which can be active at any point in time. One of the DL BWPs can be identified as default. The UE will revert to the default BWP on the expiration of a configurable idle timer (e.g., from 2 to 2560 ms). This way, in 5G, a base station can restrict a UE to transmit/receive in a smaller rectangular area of the OFDM time-frequency grids used for UL and DL, in which the smaller rectangular area is known as a BWP.

Furthermore, a BWP includes scheduling functions for L1/L2 control signaling that are self-contained within the BWP. Specifically, the UE receives PDSCH, PDCCH, Channel State Information Reference Signal (CSI-RS), and TRS within a BWP. Each DL BWP includes at least one CORESET with a search space specific to the UE. In the UL, the UE transmits PUSCH and PUCCH as well as Sounding Reference Signal (SRS) within the assigned UL BWP. A baseband function in the form of a DU and CU can be assigned to a BWP.

In addition, SIB1 includes a PLMN Identity List, which identifies the PLMNs supported on the carrier/cell. In some instances, PLMN-Ids can be used to identify tenant networks in an NHN so that UEs in any tenant network can use the IA procedure.

In some examples, small cell 506 can be specialized to support spectrum elasticity through configurable BWPs. For example, a 7-2×ORAN interface carrying eCPRI provides frequency-domain quantized symbols over Ethernet from DU 504 to O-RAN small cell 506.

In some examples, each tenant can be assigned a BWP on the small cell. For example, DU 504 can create different BWPs for different UEs, as illustrated in FIG. 5B. More details are provided below with respect to FIGS. 6A and 6B.

Figures 6A, 6B:
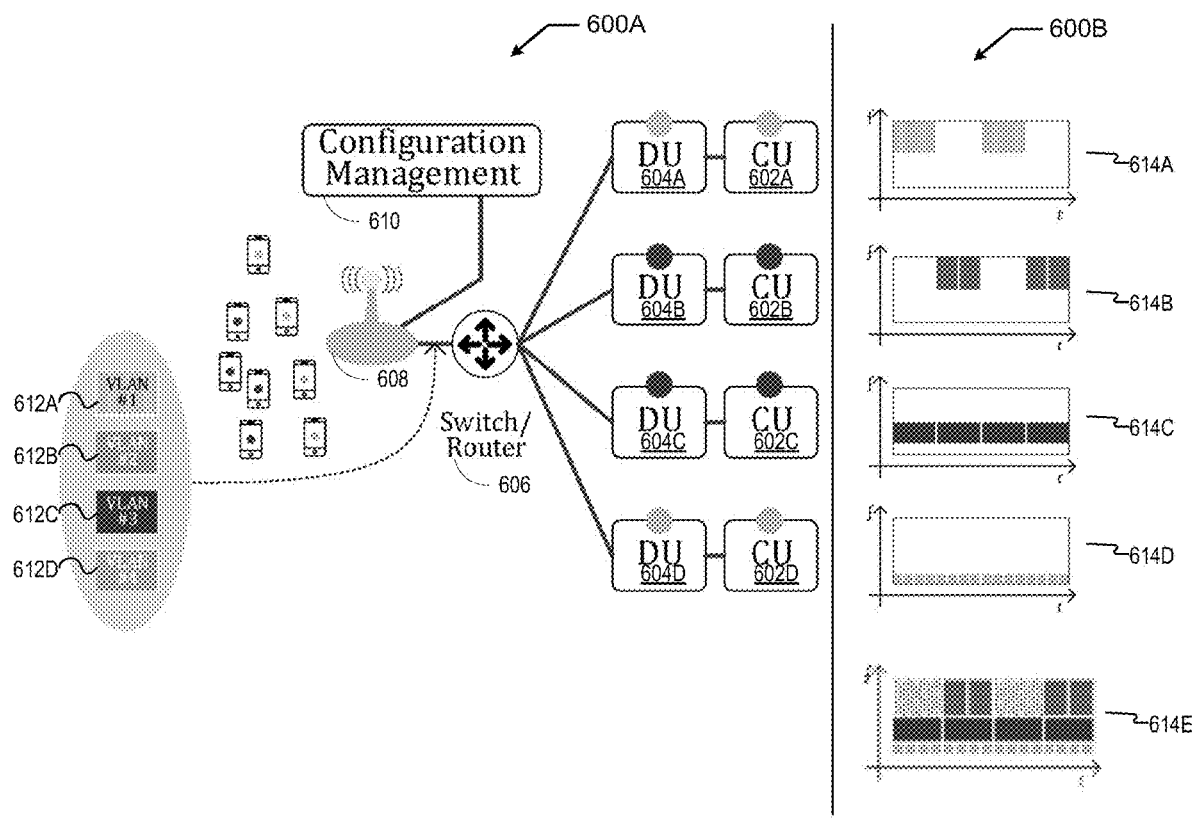
FIGS. 6A and 6B illustrate an example network architecture with carrier aggregation and a corresponding example graph of frequency domain representation of bandwidth parts in accordance with some examples of the present disclosure.

FIGS. 6A and 6B illustrate an example network architecture 600 with carrier aggregation and corresponding example graphs 500B in accordance with some examples of the present disclosure. In some examples, network architecture 600 comprises multiple combinations of CUs 602A-602D (collectively, 602) and DUs 604A-604D (collectively, 604) where each combination of CU 602 and DU 604 is assigned to a single tenant of an NHN. Each DU 604 is responsible for a BWP as shown in the corresponding frequency-domain representation of BWPs 614A-614D (collectively, 614).

Furthermore, as shown in frequency-domain representations of BWPs 614A-614D and 616, the set of UL/DL BWPs for each tenant does not overlap. The non-overlapping nature of BWPs is enforced by small cells, which are configured to drop non-compliant resource elements (REs) recreated from the frequency-domain stream.

In some instances, router/switch 606 can map different 7-2x fronthaul interfaces into VLANs 612A-612D (collectively, 612). The VLANs can be used to identify each tenant or each combination of CU and DU.

In some examples, configuration management 610 can configure small cell 608 deployed in NHN for BWP allocations. For example, configuration management 610 can set up mappings between select VLAN-IDs to frequency domain representations of BWPs (e.g., 614A-614D), which can be then processed by small cell 608. Processing by small cell 608 can include, for example, applying a cyclic prefix (CP) insertion, Inverse Fast Fourier Transform (IFFT), Digital-to-Analog Converter (DAC), and radio frequency (RF) chain in DL direction for the BWP, or applying an RF receiver chain, FFT, CP removal, and Analog-to-Digital Converter (ADC) in UL direction for the BWP.

In some instances, small cells (e.g., small cell 608) support a configuration management interface (e.g., configuration management 610). For example, configuration management 610 can manage configurations of BWPs. Each BWP is configured for each tenant. All UEs belonging to the same tenant are configured with the same BWP.

Furthermore, each small cell (e.g., small cell 608) can radiate an OFDMA grid in the DL comprised of the assembly of BWPs, one for each tenant. Also, each small cell can receive an OFDMA grid in the UL, which can parse the BWP components and map them into a separate O-RAN 7-2x interface identified in a multiplexed VLAN tag via a unique VLAN tag. In each direction, small cell 608 can drop REs outside of the BWP. Typically, this can force an error in the transport layer (e.g., northbound transport 412 and southbound transport 416 as illustrated in FIG. 4), but it can motivate each tenant to obey the BWP partitioning.

Figure 7:
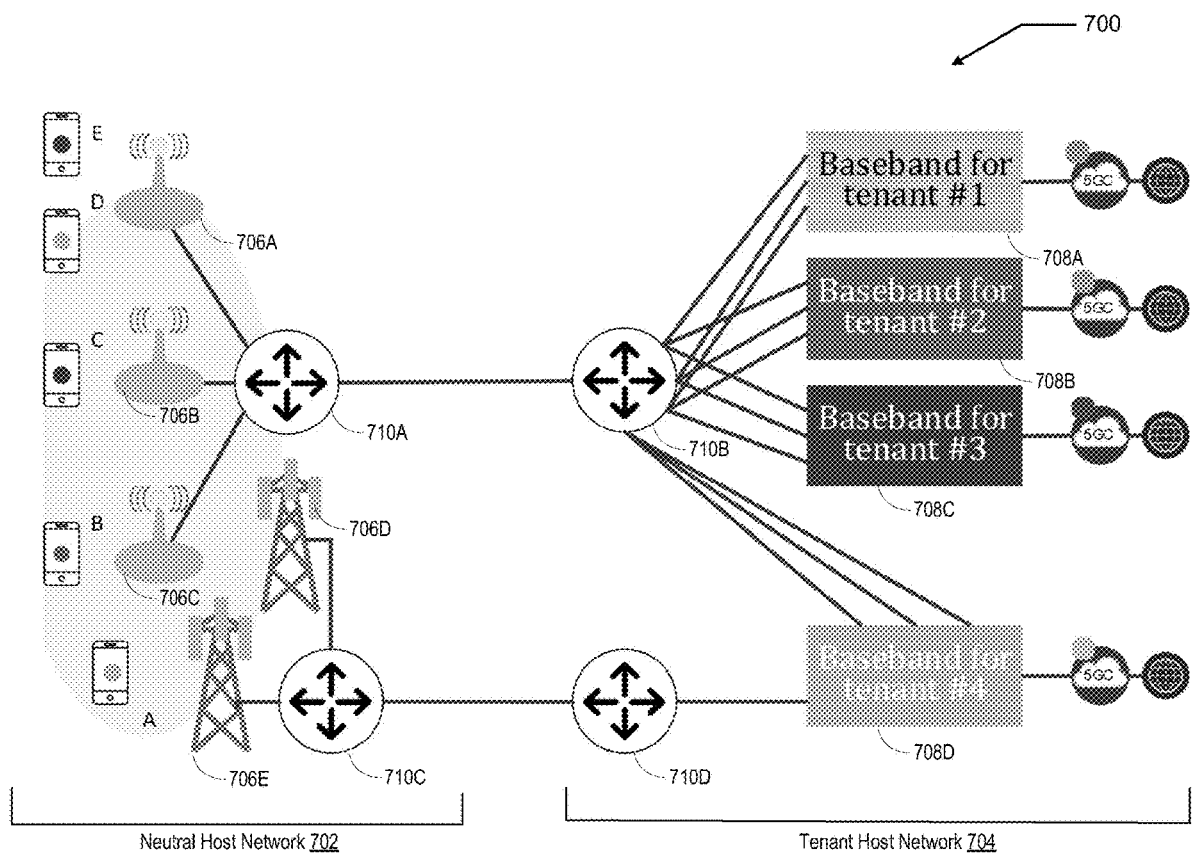
FIG. 7 illustrates an example diagram of network architecture with carrier aggregation in accordance with some examples of the present disclosure.

FIG. 7 illustrates an example diagram of a network architecture 700 with carrier aggregation in accordance with some examples of the present disclosure. In some instances, network architecture 700 comprises NHN 702 including cells 706A-706E (collectively, 706) and tenant network 704 including basebands for tenants 708A-708D (collectively, 708). Also, network architecture 700 further comprises switch/router 710A, 710B, 710C, and 710D (collectively, 710) capable of switching VLANs. Switch 710 must meet latency requirements for fronthaul, for example, ORAN 7-2x.

In some examples, each link to a tenant, for example, tenants #1-#4 as illustrated in FIG. 7, can be distinguished by its own Ethernet identifier (e.g., VLAN tag) that is inserted and/or removed by the O-RU and by basebands 708 of each tenant.

Figure 8:
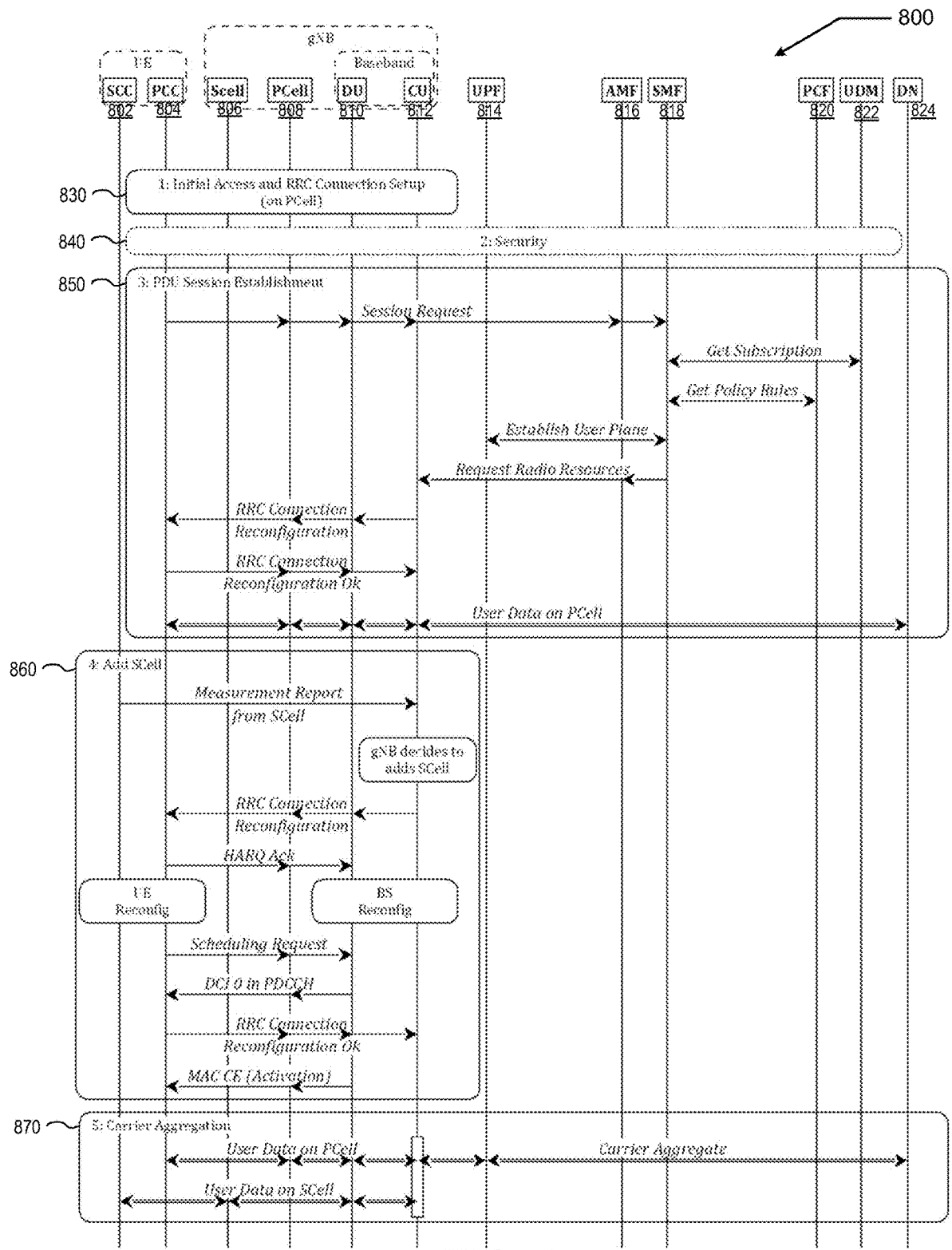
FIG. 8 illustrates an example procedure of improving capacity via carrier aggregation in accordance with some examples of the present disclosure.

FIG. 8 illustrates an example procedure 800 of improving capacity via carrier aggregation in accordance with some examples of the present disclosure. In some instances, a system for which procedure 800 can be implemented comprises secondary component carrier (SCC) 802, primary component carrier (PCC) 804, secondary cell (SCell) 806, primary cell (PCell) 808, DU 810, CU 812, UPF 814, AMF 816, SMF 818, PCF 820, UDM 822, and data network (DN) 824. Procedure 800 for improving capacity via carrier aggregation generally includes initial access and RRC connection setup procedure (step 830), security procedure (step 840), PDU session establishment (step 850), addition of SCell (step 860), and implementation of carrier aggregation (step 830).

In some examples, a small cell network (e.g., NHN 302 in FIG. 3 or NHN 402 in FIG. 4) can be considered as a set of SCells 806 subordinate to PCell 808, which resides in the macro network (e.g., tenant network 304 in FIG. 3 or tenant network 404 in FIG. 4).

Prior to the initial access and RRC connection setup procedure (step 830), all of the SCells 806 have registered with DU 810 through the O-RAN procedure.

During the initial access and RRC connection setup procedure (step 830), typically a UE does not know what BWP allocations are used by each tenant. As such, BWPs need to be bootstrapped into the system. The process for onboarding the UE that finds itself in the coverage of the small cell network (e.g., NHN) can rely on a special CU/DU combination run by the small cell network operator (e.g., NHN operator). As the UE enters the overage of the small cell network (e.g., NHN), the UE can utilize the initial UL/DL BWPs. After checking SIB1 to make sure that the PLMN-ID in a SIM card matches one in the PLMN Identity List, an RRC connection can be established. Then, a proper UL/DL BWP can be configured to be suitable for the PLMN-ID.

In some instances, the RRC connection setup occurs in PCell 808, which is part of the macro network (e.g., tenant network). A baseband (e.g., basebands 708 as illustrated in FIG. 7) using the small cell network (e.g., NHN) to add capacity to a macro network (e.g., tenant network) through carrier aggregation can be configured to have several subtending small cells each configured for the same BWP.

At step 840, the security procedure occurs, for example, in accordance with standard Authentication Key Agreement (AKA) described in 3GPP for 5G and LTE.

At step 850, a PDU session can be established. The subscription of the PDU session can determine whether a subscriber has access to carrier aggregation. Once the PDU session is established, user data flow occurs through PCell 808. Also, an RRC connection reconfiguration establishes that carrier aggregation is to be enabled on SCells 806, which are in the small cell network (e.g., NHN).

At step 860, Scell 806 can be added at a fronthaul gateway through MAC control elements. For example, an enhanced fronthaul gateway can connect small cells in the NHN with a carrier baseband of the tenants' network based on a fronthaul interface to support carrier aggregation.

Also, during step 860, UE can provide measurement reports on the small cell network (e.g., NHN). For example, MAC control elements allow UEs to communicate with the MAC layer. In the case of carrier aggregation, MAC control elements can provide information telling the UE to activate a SCell (e.g., Scell 806).

At step 870, carrier aggregation can be implemented. For example, the configured multiple serving cells, PCell 808 and SCell 806 can be aggregated together to serve the UE.

In some instances, if SCell 806 is not needed after a predetermined period of time (i.e., expiration of an idle timer), SCell 806 can be deactivated.

Figure 9:
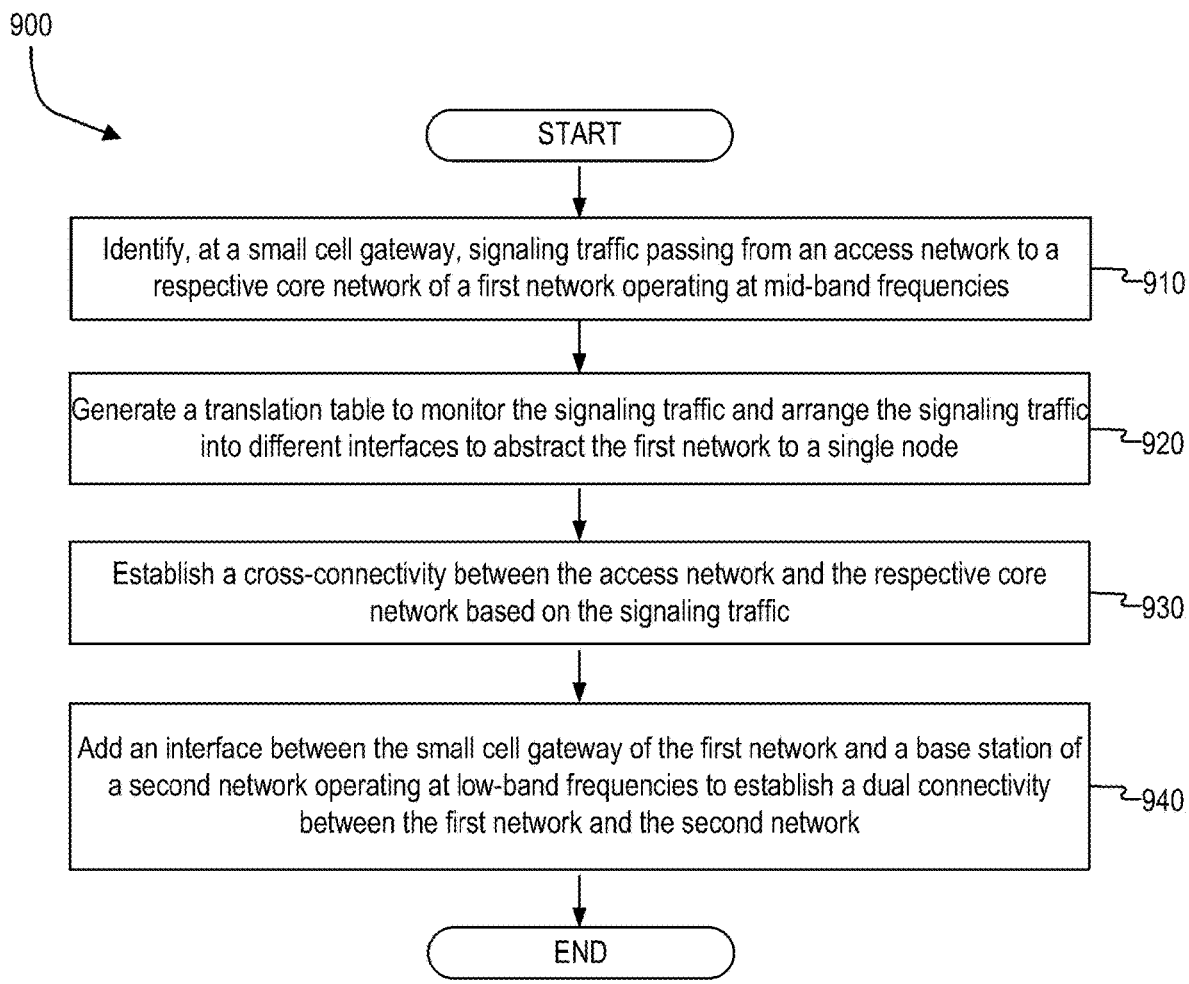
FIG. 9 illustrates an example method of providing enhanced capacity by establishing dual connectivity in accordance with some examples of the present disclosure.

FIG. 9 illustrates a flowchart of an example method 900 for providing enhanced capacity by establishing dual connectivity in accordance with some examples of the present disclosure. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some examples, the method includes identifying, at a small cell gateway, signaling traffic passing from an access network to a respective core network of a first network operating at mid-band frequencies at step 910. For example, the E-SCG 308 illustrated in FIG. 3 may identify, at a small cell gateway, signal traffic passing from an access network to a respective core network of NHN 302 operating at mid-band frequencies.

According to some examples, the method includes generating a translation table to monitor the signaling traffic and arrange the signaling traffic into different interfaces to abstract the first network to a single node at step 920. For example, the E-SCG 308 as illustrated in FIG. 3 may generate a translation table to monitor the signaling traffic and arrange the signaling traffic into different interfaces to abstract NHN 302 into a single node.

According to some examples, the method includes establishing a cross-connectivity between the access network and the respective core network based on the signaling traffic at step 930. For example, a cross-connectivity can be established between the access network of NHN 302 as illustrated in FIG. 3 and the respective core network based on the signaling traffic.

In some examples, the cross-connectivity is established through a network controller at the small cell gateway, the network controller controlling a data flow between the access network and the respective core network. For example, as illustrated in FIG. 4, the cross-connectivity is established through network controller 408 at E-SCG 406. Also, network controller 408 controls a data flow between the access network of NHN 402 and the respective core network.

In some examples, the network controller includes a list of PLMN identifiers of one or more core networks connected to the network controller. For example, network controller 408 as illustrated in FIG. 4 includes a list of PLMN identifiers of one or more core networks connected to network controller 408.

According to some examples, the method includes adding an interface between the small cell gateway of the first network and a base station of a second network operating at low-band frequencies to establish a dual connectivity between the first network and the second network at step 940. For example, X2 or Xn interface 314 can be added between E-SCG 308 of NHN 302 and base station 318 of tenant network 304 operating at low-band frequencies to establish dual connectivity between NHN 302 and tenant network 304. In some examples, the dual connectivity is one of an EN-DC or an NR-DC.

In some examples, the dual connectivity between the first network and the second network provides the second network with access to a capacity layer of the first network. For example, as illustrated in FIG. 3, the dual connectivity between NHN 302 and tenant network 304 provides tenant network 304 with access to a capacity layer of NHN 302.

Figure 10:
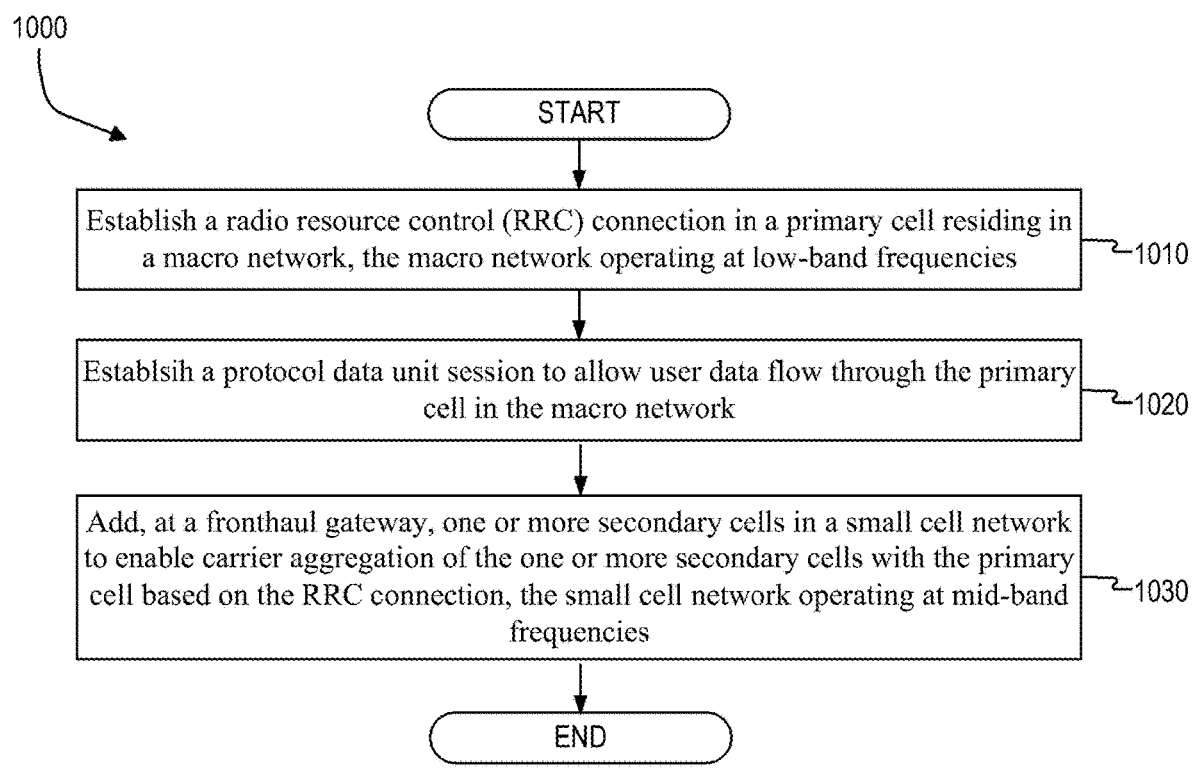
FIG. 10 illustrates an example method of providing enhanced capacity via carrier aggregation in accordance with some examples of the present disclosure.

FIG. 10 illustrates is a flowchart of an example method 1000 for providing enhanced capacity via carrier aggregation in accordance with some examples of the present disclosure. Although the example method 1000 depicts a particular sequence of operations, the sequence may be altered without departing from the scope of the present disclosure. For example, some of the operations depicted may be performed in parallel or in a different sequence that does not materially affect the function of the method 1000. In other examples, different components of an example device or system that implements the method 1000 may perform functions at substantially the same time or in a specific sequence.

According to some examples, the method includes establishing an RRC connection in a primary cell residing in a macro network, the macro network operating at low-band frequencies at step 1010. For example, base station 602 illustrated in FIG. 6 may establish an RRC connection in a primary cell residing in the macro network, which operates at low-band frequencies.

According to some examples, the method includes establishing a PDU session to allow user data flow through the primary cell in the macro network at step 1020. For example, base station 602 illustrated in FIG. 6 may establish a protocol data unit session to allow user data flow through the primary cell in the macro network.

According to some examples, the method includes adding, at a fronthaul gateway, one or more secondary cells in a small cell network to enable carrier aggregation of the one or more secondary cells with the primary cell based on the RRC connection, the small cell network operating at mid-band frequencies at step 1030. For example, base station 602 illustrated in FIG. 6 may add, at a fronthaul gateway, one or more secondary cells in a small cell network to enable carrier aggregation of the one or more secondary cells with the primary cell based on the RRC connection, the small cell network operating at mid-band frequencies. In some examples, the tenant network has an access to a capacity layer of the neutral host network. In some examples, a network node of the small cell network adds the one or more secondary cells through MAC elements. In some examples, the one or more secondary cells are aggregated with a plurality of primary cells. In some examples, the small cell network appears as a set of the one or more secondary cells subordinate to the primary cell residing in the macro network. In some examples, the small cell network is a neutral host network and the macro network is a tenant network.

According to some examples, the method includes partitioning bandwidth in the small cell network into one or more bandwidth parts at step 1040. For example, small cell 608 as illustrated in FIG. 6 may partition bandwidth in the small cell network into one or more bandwidth parts. In some examples, each of the one or more bandwidth parts is allocated to each of one or more basebands of the macro network. In some examples, the one or more secondary cells residing in the small cell network partition network traffic into physical resource blocks.

According to some examples, the method includes identifying the macro network based on a VLAN identifier associated with the primary cell, the VLAN identifier mapped to a bandwidth part associated with the macro network at step 1050. For example, small cell 608 illustrated in FIG. 6 may identify the macro network based on a VLAN identifier associated with the primary cell, the VLAN identifier mapped to a bandwidth part associated with the macro network.

According to some examples, the method includes receiving a measurement report on the small cell network at step 1060. For example, base station 602 (e.g., CU) illustrated in FIG. 6 may receive a measurement report on the small cell network. In some examples, the addition of the one or more secondary cells in the small cell network is based on the measurement report.

Figure 11:
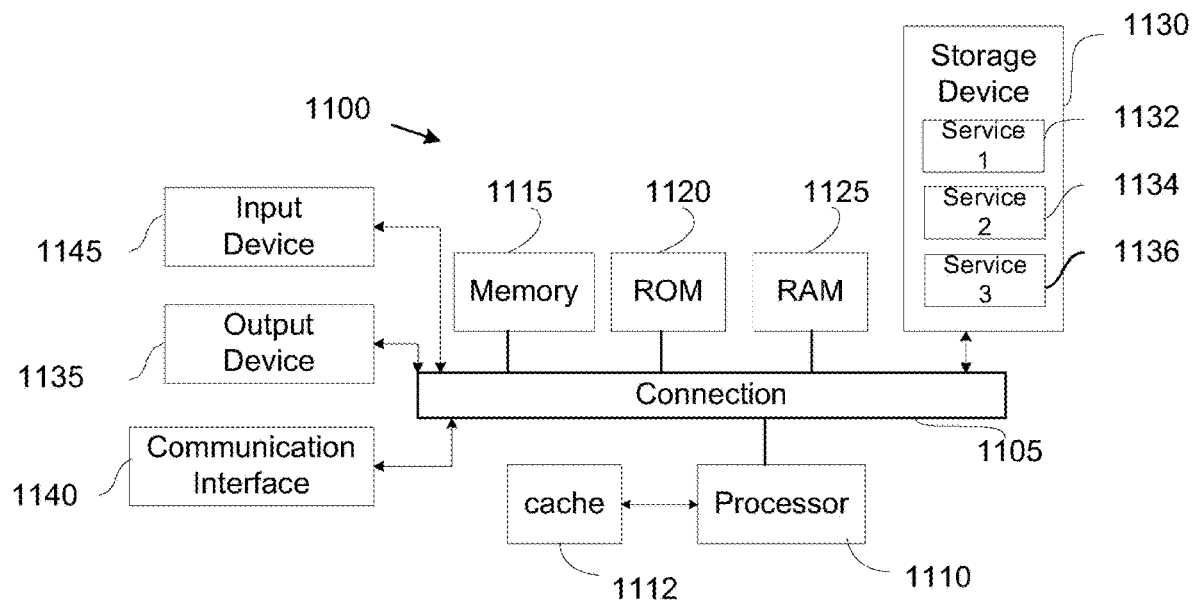
FIG. 11 shows an example computing system, which can be for example any computing device that can implement components of the system.

FIG. 11 illustrates an example computing system 1100 including components in electrical communication with each other using a connection 1105 upon which one or more aspects of the present disclosure can be implemented. Connection 1105 can be a physical connection via a bus, or a direct connection into processor 1110, such as in a chipset architecture. Connection 1105 can also be a virtual connection, networked connection, or logical connection.

In some embodiments computing system 1100 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read only memory (ROM) 1120 and random access memory (RAM) 1125 to processor 1110. Computing system 1100 can include a cache of high-speed memory 1112 connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. There is no restriction on operating on any particular hardware arrangement and therefore the basic features here may easily be substituted for improved hardware or firmware arrangements as they are developed.

Storage device 1130 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

Figure 12:
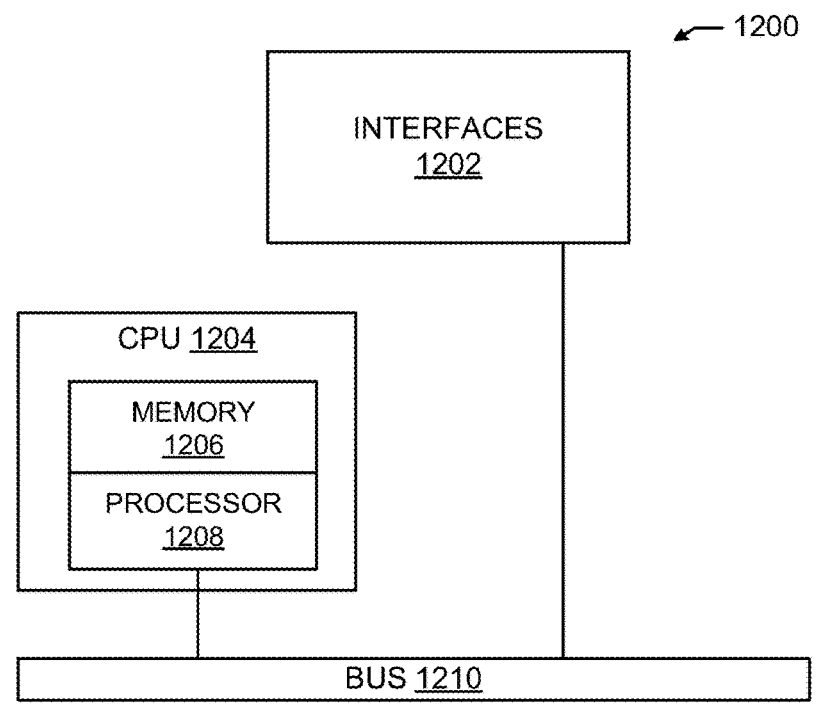
FIG. 12 illustrates an example network device.

FIG. 12 illustrates an example network device 1200 suitable for performing switching, routing, load balancing, and other networking operations. Network device 1200 includes a central processing unit (CPU) 1204, interfaces 1202, and a bus 1210 (e.g., a PCI bus). When acting under the control of appropriate software or firmware, the CPU 1204 is responsible for executing packet management, error detection, and/or routing functions. The CPU 1204 preferably accomplishes all these functions under the control of software including an operating system and any appropriate applications software. CPU 1204 may include one or more processors 1208, such as a processor from the INTEL X86 family of microprocessors. In some cases, processor 1208 can be specially designed hardware for controlling the operations of network device 1200. In some cases, a memory 1206 (e.g., non-volatile RAM, ROM, etc.) also forms part of CPU 1204. However, there are many different ways in which memory could be coupled to the system.

The interfaces 1202 are typically provided as modular interface cards (sometimes referred to as "line cards"). Generally, they control the sending and receiving of data packets over the network and sometimes support other peripherals used with the network device 1200. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 1204 to efficiently perform routing computations, network diagnostics, security functions, etc.

Although the system shown in FIG. 12 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 1200.

Regardless of the network device's configuration, it may employ one or more memories or memory modules (including memory 1206) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1206 could also hold various software containers and virtualized execution environments and data.

The network device 1200 can also include an application-specific integrated circuit (ASIC), which can be configured to perform routing and/or switching operations. The ASIC can communicate with other components in the network device 1200 via the bus 1210, to exchange data and signals and coordinate various types of operations by the network device 1200, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method for improving capacity through a multi-connectivity: identifying, at a small cell gateway, signaling traffic passing from an access network to a respective core network of a first network operating at mid-band frequencies; establishing a cross-connectivity between the access network and the respective core network based on the signaling traffic; and adding an interface between the small cell gateway of the first network and a base station of a second network operating at low-band frequencies to establish dual connectivity between the first network and the second network.

Aspect 2. The method of Aspect 1, further comprising: generating a translation table to monitor the signaling traffic and arrange the signaling traffic into different interfaces to abstract the first network to a single node.

Aspect 3. The method of any of Aspects 1 to 2, wherein the cross-connectivity is established through a network controller at the small cell gateway, the network controller controlling a data flow between the access network and the respective core network.

Aspect 4. The method of any of Aspects 1 to 3, wherein the network controller includes a list of public land mobile network (PLMN) identifiers of one or more core networks connected to the network controller.

Aspect 5. The method of any of Aspects 1 to 4, wherein the first network is a neutral host network and the second network is a tenant network.

Aspect 6. The method of any of Aspects 1 to 5, wherein the dual connectivity is one of an Evolved-Terrestrial Radio Access Network New Radio-Dual Connectivity (ENDC) or a New Radio-Dual Connectivity (NRDC).

Aspect 7. The method of any of Aspects 1 to 6, wherein the dual connectivity between the first network and the second network provides the second network with access to a capacity layer of the first network.

Aspect 8. A method for improving capacity through a multi-connectivity: establishing a radio resource control (RRC) connection in a primary cell residing in a macro network, the macro network operating at low-band frequencies; establishing a protocol data unit session to allow user data flow through the primary cell in the macro network; and adding, at a fronthaul gateway, one or more secondary cells in a small cell network to enable carrier aggregation of the one or more secondary cells with the primary cell based on the RRC connection, the small cell network operating at mid-band frequencies.

Aspect 9. The method of Aspect 8, further comprising: partitioning bandwidth in the small cell network into one or more bandwidth parts, wherein each of the one or more bandwidth parts is allocated to each of one or more basebands of the macro network.

Aspect 10. The method of any of Aspects 8 to 9, further comprising: identifying the macro network based on a virtual local area network (VLAN) identifier associated with the primary cell, the VLAN identifier mapped to a bandwidth part associated with the macro network.

Aspect 11. The method of any of Aspects 8 to 10, further comprising: receiving a measurement report on the small cell network, wherein the addition of the one or more secondary cells in the small cell network is based on the measurement report.

Aspect 12. The method of any of Aspects 8 to 11, wherein a network node of the small cell network adds the one or more secondary cells through medium access control (MAC) elements.

Aspect 13. The method of any of Aspects 8 to 12, wherein the one or more secondary cells residing in the small cell network partition network traffic into physical resource blocks.

Aspect 14. The method of any of Aspects 8 to 13, wherein the one or more secondary cells are aggregated with a plurality of primary cells.

Aspect 15. The method of any of Aspects 8 to 14, wherein the small cell network appears as a set of the one or more secondary cells subordinate to the primary cell residing in the macro network.

Aspect 16. The method of any of Aspects 8 to 15, wherein the small cell network is a neutral host network and the macro network is a tenant network, and wherein the tenant network has an access to a capacity layer of the neutral host network.

Aspect 17. A system for improving capacity through a multi-connectivity, comprising: a storage configured to store instructions; a processor configured to execute the instructions and cause the processor to: identify, at a small cell gateway, signal traffic passing from an access network to a respective core network of a first network operating at mid-band frequencies; establish a cross-connectivity between the access network and the respective core network based on the signaling traffic; and add an interface between the small cell gateway of the first network and a base station of a second network operating at low-band frequencies to establish dual connectivity between the first network and the second network.

Aspect 18. The system of Aspect 17, wherein the processor is configured to execute the instructions and cause the processor to: generate a translation table to monitor the signaling traffic and arrange the signaling traffic into different interfaces to abstract the first network to a single node.

Aspect 19. The system of any of Aspects 17 to 18, wherein the cross-connectivity is established through a network controller at the small cell gateway, the network controller controlling a data flow between the access network and the respective core network.

Aspect 20. The system of any of Aspects 17 to 19, wherein the network controller includes a list of public land mobile network (PLMN) identifiers of one or more core networks connected to the network controller.

Aspect 21. The system of any of Aspects 17 to 20, wherein the first network is a neutral host network and the second network is a tenant network.

Aspect 22. The system of any of Aspects 17 to 21, wherein the dual connectivity is one of an Evolved-Terrestrial Radio Access Network New Radio-Dual Connectivity (ENDC) or a New Radio-Dual Connectivity (NRDC).

Aspect 23. The system of any of Aspects 17 to 22, wherein the dual connectivity between the first network and the second network provides the second network with access to a capacity layer of the first network.

Aspect 24. A system for improving capacity through a multi-connectivity, comprising: a storage configured to store instructions; a processor configured to execute the instructions and cause the processor to: establish a radio resource control (RRC) connection in a primary cell residing in a macro network, the macro network operating at low-band frequencies; establish a protocol data unit session to allow user data flow through the primary cell in the macro network; and adding, the small cell network operating at mid-band frequencies.

Aspect 25. The system of Aspect 24, wherein the processor is configured to execute the instructions and cause the processor to: partition bandwidth in the small cell network into one or more bandwidth parts, wherein each of the one or more bandwidth parts is allocated to each of one or more basebands of the macro network.

Aspect 26. The system of any of Aspects 24 to 25, wherein the processor is configured to execute the instructions and cause the processor to: identify the macro network based on a virtual local area network (VLAN) identifier associated with the primary cell, the VLAN identifier mapped to a bandwidth part associated with the macro network.

Aspect 27. The system of any of Aspects 24 to 26, wherein the processor is configured to execute the instructions and cause the processor to: receive a measurement report on the small cell network, wherein the addition of the one or more secondary cells in the small cell network is based on the measurement report.

Aspect 28. The system of any of Aspects 24 to 27, wherein a network node of the small cell network adds the one or more secondary cells through medium access control (MAC) elements.

Aspect 29. The system of any of Aspects 24 to 28, wherein the one or more secondary cells residing in the small cell network partition network traffic into physical resource blocks.

Aspect 30. The system of any of Aspects 24 to 29, wherein the one or more secondary cells are aggregated with a plurality of primary cells.

Aspect 31. The system of any of Aspects 24 to 30, wherein the small cell network appears as a set of the one or more secondary cells subordinate to the primary cell residing in the macro network.

Aspect 32. The system of any of Aspects 24 to 31, wherein the small cell network is a neutral host network and the macro network is a tenant network, and wherein the tenant network has an access to a capacity layer of the neutral host network.

Aspect 33. A non-transitory computer readable medium comprising instructions, the instructions, when executed by a computing system, cause the computing system to: identifying, at a small cell gateway, signal traffic passing from an access network to a respective core network of a first network operating at mid-band frequencies; establish a cross-connectivity between the access network and the respective core network based on the signaling traffic; and add an interface between the small cell gateway of the first network and a base station of a second network operating at low-band frequencies to establish dual connectivity between the first network and the second network.

Aspect 34. The computer readable medium of Aspect 33, wherein the computer readable medium further comprises instructions that, when executed by the computing system, cause the computing system to: generate a translation table to monitor the signaling traffic and arrange the signaling traffic into different interfaces to abstract the first network to a single node.

Aspect 35. The computer readable medium of any of Aspects 33 to 34, wherein the cross-connectivity is established through a network controller at the small cell gateway, the network controller controlling a data flow between the access network and the respective core network.

Aspect 36. The computer readable medium of any of Aspects 33 to 35, wherein the network controller includes a list of public land mobile network (PLMN) identifiers of one or more core networks connected to the network controller.

Aspect 37. The computer readable medium of any of Aspects 33 to 36, wherein the first network is a neutral host network and the second network is a tenant network.

Aspect 38. The computer readable medium of any of Aspects 33 to 37, wherein the dual connectivity is one of an Evolved-Terrestrial Radio Access Network New Radio-Dual Connectivity (ENDC) or a New Radio-Dual Connectivity (NRDC).

Aspect 39. The computer readable medium of any of Aspects 33 to 38, wherein the dual connectivity between the first network and the second network provides the second network with access to a capacity layer of the first network.

Aspect 40. A non-transitory computer readable medium comprising instructions, the instructions, when executed by a computing system, cause the computing system to: establish a radio resource control (RRC) connection in a primary cell residing in a macro network, the macro network operating at low-band frequencies; establish a protocol data unit session to allow user data flow through the primary cell in the macro network; and adding, the small cell network operating at mid-band frequencies.

Aspect 41. The computer readable medium of Aspect 40, wherein the computer readable medium further comprises instructions that, when executed by the computing system, cause the computing system to: partitioning bandwidth in the small cell network into one or more bandwidth parts, wherein each of the one or more bandwidth parts is allocated to each of one or more basebands of the macro network.

Aspect 42. The computer readable medium of any of Aspects 40 to 41, wherein the computer readable medium further comprises instructions that, when executed by the computing system, cause the computing system to: identify the macro network based on a virtual local area network (VLAN) identifier associated with the primary cell, the VLAN identifier mapped to a bandwidth part associated with the macro network.

Aspect 43. The computer readable medium of any of Aspects 40 to 42, wherein the computer readable medium further comprises instructions that, when executed by the computing system, cause the computing system to: receive a measurement report on the small cell network, wherein the addition of the one or more secondary cells in the small cell network is based on the measurement report.

Aspect 44. The computer readable medium of any of Aspects 40 to 43, wherein a network node of the small cell network adds the one or more secondary cells through medium access control (MAC) elements.

Aspect 45. The computer readable medium of any of Aspects 40 to 44, wherein the one or more secondary cells residing in the small cell network partition network traffic into physical resource blocks.

Aspect 46. The computer readable medium of any of Aspects 40 to 45, wherein the one or more secondary cells are aggregated with a plurality of primary cells.

Aspect 47. The computer readable medium of any of Aspects 40 to 46, wherein the small cell network appears as a set of the one or more secondary cells subordinate to the primary cell residing in the macro network.

Aspect 48. The computer readable medium of any of Aspects 40 to 47, wherein the small cell network is a neutral host network and the macro network is a tenant network, wherein the tenant network has an access to a capacity layer of the neutral host network.

What is claimed is:

1. A method comprising:
identifying, at a small cell gateway, signaling traffic passing from an access network to a respective core network of a first network operating at mid-band frequencies;
establishing a cross-connectivity between the access network and the respective core network based on the signaling traffic;
adding an interface between the small cell gateway of the first network and a base station of a second network operating at low-band frequencies to establish dual connectivity between the first network and the second network; and
generating a translation table to monitor the signaling traffic and arrange the signaling traffic into different interfaces to abstract the first network to a single node.

2. The method of claim 1, wherein the cross-connectivity is established through a network controller at the small cell gateway, the network controller controlling a data flow between the access network and the respective core network.

3. The method of claim 2, wherein the network controller includes a list of public land mobile network (PLMN) identifiers of one or more core networks connected to the network controller.

4. The method of claim 1, wherein the first network is a neutral host network and the second network is a tenant network.

5. The method of claim 1, wherein the dual connectivity is one of an Evolved-Terrestrial Radio Access Network New Radio-Dual Connectivity (ENDC) or a New Radio-Dual Connectivity (NRDC).

6. The method of claim 1, wherein the dual connectivity between the first network and the second network provides the second network with access to a capacity layer of the first network.

7. A system for improving capacity through a multi-connectivity comprising:
one or more processors; and
at least one computer-readable storage medium having stored therein instructions which, when executed by the one or more processors, cause the one or more processors to perform operations comprising:
identifying, at a small cell gateway, signaling traffic passing from an access network to a respective core network of a first network operating at mid-band frequencies;
establishing a cross-connectivity between the access network and the respective core network based on the signaling traffic;
adding an interface between the small cell gateway of the first network and a base station of a second network operating at low-band frequencies to establish dual connectivity between the first network and the second network; and
generate a translation table to monitor the signaling traffic and arrange the signaling traffic into different interfaces to abstract the first network to a single node.

8. The system of claim 7, wherein the instructions which, when executed by the one or more processors, cause the one or more processors to perform operations further comprising:
establishing a radio resource control (RRC) connection in a primary cell residing in a macro network, the macro network operating at low-band frequencies;
establishing a protocol data unit session to allow user data flow through the primary cell in the macro network; and
adding, at a fronthaul gateway, one or more secondary cells in a small cell network to enable carrier aggregation of the one or more secondary cells with the primary cell based on the RRC connection, the small cell network operating at mid-band frequencies.

9. The system of claim 7, wherein the cross-connectivity is established through a network controller at the small cell gateway, the network controller controlling a data flow between the access network and the respective core network.

10. The system of claim 8, wherein the instructions which, when executed by the one or more processors, cause the one or more processors to perform operations further comprising:
partitioning bandwidth in the small cell network into one or more bandwidth parts, wherein each of the one or more bandwidth parts is allocated to each of one or more basebands of the macro network.

* * * * *